(12) United States Patent
Kato

(10) Patent No.: US 7,790,125 B2
(45) Date of Patent: Sep. 7, 2010

(54) FUEL CELL

(75) Inventor: Manabu Kato, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/293,854

(22) PCT Filed: Mar. 29, 2007

(86) PCT No.: PCT/IB2007/000804

§ 371 (c)(1),
(2), (4) Date: Sep. 22, 2008

(87) PCT Pub. No.: WO2007/119134

PCT Pub. Date: Oct. 25, 2007

(65) Prior Publication Data

US 2009/0246587 A1    Oct. 1, 2009

(30) Foreign Application Priority Data

Apr. 14, 2006    (JP) ............... 2006-111843

(51) Int. Cl.
*H01M 8/10*    (2006.01)

(52) U.S. Cl. ............... 423/42; 423/30; 423/40

(58) Field of Classification Search ............. 429/30
See application file for complete search history.

(56) References Cited

U.S. PATENT DOCUMENTS

| 4,409,129 | A | * | 10/1983 | Takeuchi et al. ............ 502/185 |
| 6,936,370 | B1 | * | 8/2005 | Knights et al. ............... 429/40 |
| 2004/0126644 | A1 | * | 7/2004 | Bett et al. .................... 429/40 |
| 2004/0166400 | A1 | | 8/2004 | Gascoyne et al. |
| 2005/0227855 | A1 | * | 10/2005 | Manco et al. .............. 502/101 |

FOREIGN PATENT DOCUMENTS

| JP | 2003-508877 A | 3/2003 |
| JP | 2004-022503 A | 1/2004 |
| JP | 2005-135671 A | 5/2005 |
| JP | 2005-141966 A | 6/2005 |
| JP | 2005-149742 A | 6/2005 |
| JP | 2005-294264 A | 10/2005 |
| WO | WO 03/032418 A | 4/2003 |

* cited by examiner

*Primary Examiner*—Jerry Lorengo
*Assistant Examiner*—Jared Wood
(74) *Attorney, Agent, or Firm*—Kenyon & Kenyon LLP

(57) ABSTRACT

A fuel cell includes an anode, a cathode, and an electrolyte membrane arranged between the anode and the cathode. A fuel deficiency countermeasure is implemented for the anode and a fuel deficiency countermeasure is implemented for the cathode. As a result, the fuel cell suppresses a decline in performance caused by a fuel deficiency.

4 Claims, 5 Drawing Sheets

FUEL CELL

This is a 371 national phase application of PCT/IB2007/000804 filed 29 Mar. 2007, claiming priority to Japanese Patent Application No. 2006-111843 filed 14 Apr. 2006, the contents of which are incorporated herein by reference.

BACKGROUND OF THE INVENTION

1. Field of the Invention

The invention relates to a fuel cell, and more particularly concerns a fuel cell able to suppress a decline in performance caused by a fuel deficiency.

2. Description of the Related Art

A fuel cell generates electrical energy through an electrochemical reaction in a membrane electrode assembly (hereinafter "MEA"), which includes an electrolyte membrane and electrodes (i.e., an anode and a cathode) arranged on both sides of the electrolyte membrane. The electrical energy that is generated is then extracted from the MEA via separators arranged on both sides of the MEA. Among the various types of fuel cells that exist today, polymer electrolyte fuel cells (hereinafter "PEFC"), which are used in home cogeneration systems and automobiles and the like, are able to operate in a low temperature range. PEFCs are also receiving much attention as power supplies that are ideal for electric vehicles and as mobile power supplies because they exhibit high energy-conversion efficiency, have a short startup time, and the systems are small and lightweight.

A single cell of a PEFC includes an electrolyte membrane and an anode and a cathode. Both the anode and the cathode each have at least a catalyst layer. The theoretical electromotive force of a single cell is 1.23 volts. However, because this low electromotive force is insufficient for power supplies for electric vehicles and the like, single cells are normally stacked together in series to form a stack. End plates or the like are then arranged on both ends of the stack in the stacking direction to form a stacked PEFC. A tightening pressure is applied from both ends, in the form of a stacked PEFC, to reduce contact resistance.

The electrochemical reaction that generates electricity in the PEFC progresses in the following stages for example. First, hydrogen delivered to the anode is broken down into hydrogen ions and electrons in the presence of a catalyst (such as platinum supporting carbon; hereinafter platinum may also be referred to as "normal catalyst").

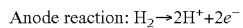

Anode reaction: $H_2 \rightarrow 2H^+ + 2e^-$

The hydrogen ions (hereinafter also referred to as "proton") that are freed then travel to the cathode by passing through an electrolyte membrane, which conducts ions when moist. Because the electrolyte membrane only allows ions to pass through, the freed electrons, which are unable to pass through the electrolyte membrane, travel to the cathode via an external circuit. It is the movement of electrons by which the fuel cell generates electricity. Meanwhile, water is produced by the reaction of oxygen, which is delivered to the cathode, with the electrons and protons that have traveled to the cathode.

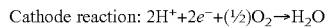

Cathode reaction: $2H^+ + 2e^- + (1/2)O_2 \rightarrow H_2O$

When a PEFC operates, the interior of the cells are in various gas states so the anode may be exposed to a high potential state (such as a potential state of 1.6 V). In a high potential state, the constituent material of the anode (such as Pt, C, etc.) degrades, which reduces the performance of the PEFC. Therefore, it is desirable to suppress material degradation when the potential is high.

Various technologies have thus far been described that attempt to improve the performance of fuel cells by suppressing material degradation and the like when there is a fuel deficiency. For example, Published Japanese Translation of PCT application, JP-T-2003-508877 describes combining a water electrolysis catalyst with an electrode catalyst to minimize corrosion of the carrier of an anode catalyst when there is a shortage of hydrogen. The publication asserts that the resulting catalyst further increases resistance against battery reversal of a fuel cell.

Also, Japanese Patent Application Publication No. JP-A-2004-22503 describes an anode of a proton-exchange membrane fuel cell that includes at least one reaction layer in contact with a solid polymer electrolyte membrane and promotes a fuel cell reaction and at least one water splitting layer in contact with a diffusion layer and decomposes water in the anode using an electric current. The publication asserts that the described technology provides an anode of a proton-exchange membrane fuel cell that inhibits a decrease in the electrode characteristics even when there is a shortage of fuel.

Further, Japanese Patent Application Publication No. JP-A-2005-149742 describes a catalyst carrier electrode for a proton-exchange membrane fuel cell, which has a metal-supported catalyst, in which a catalyst metal is carried on a catalyst metal carrier that uses conductive metal oxide that is highly resistant to corrosion. This publication asserts that it possible to maintain power-generating performance of the fuel cell even of the cathode is exposed to a high potential state. In addition, Japanese Patent Application Publication No. JP-A-2005-135671 describes an electrode and the like that is formed of at least catalyst metal particles, a catalyst carrier, the main component of which is two or more types of carbon with different electron conductivities, and a proton conducting member. The electrode includes more of the catalyst carrier having the highest electron conductivity than it does of the other catalyst carrier(s). This publication asserts that corrosion of carbon is suppressed in the resulting electrode so that deterioration of electrode performance prevented.

In addition, Japanese Patent Application Publication No. JP-A-2005-141966 describes a catalyst carrier electrode with an electrode catalyst layer that includes a catalyst metal carrier conductive member in which a catalyst metal is carried on a conductive carrier, and an electrolyte polymer. The catalyst carrier electrode is characterized in that the electrode catalyst layer contains an electrolyte polymer and/or a conductive carrier containing water repellant material. The publication asserts that the described technology ensures that water and gas are able to pass through the catalyst layer by having the layer of water repellant material be sacrificed and broken up so that the water repellant material is released over time. As a result, corrosion of the catalyst layer from water is effectively prevented. Furthermore, Japanese Patent Application Publication No. JP-A-2005-294264 describes a membrane electrode assembly with a cathode catalyst layer that includes a composite of platinum black and a carried catalyst. The publication asserts that the described technology provides a fuel cell that degrades little and thus has a long life while maintaining battery performance.

The technologies described in JP-T-2003-508877 and JP-A-2004-22503 are able to suppress the corrosion of the anode constituent material (such as carbon) by promoting a water electrolysis reaction. However, the technologies in JP-T-2003-508877 and JP-A-2004-22503 only go so far as to implement measures for the anode as countermeasure technologies for when there is a deficiency of fuel. That is, JP-T-2003-508877 and JP-A-2004-22503 make no mention of technology for implementing measures for both the anode and the cathode as countermeasure technology for when there is a deficiency of fuel.

The following regarding countermeasure technology for when there is a deficiency of fuel was discovered by the inventors through intense study.

1) The anode is exposed to a high potential state when there is a shortage of fuel (hereinafter referred to as "hydrogen") supplied to the anode side.

2) While hydrogen is supplied only to the hydrogen inlet area as hydrogen starts to be supplied to the anode side when the anode side returns from the hydrogen deficient state, a so-called partial battery is formed because the hydrogen has not yet spread to the hydrogen outlet area (hereinafter also referred to as "the anode outlet area"). When this happens the potential at the portion of the cathode opposite the anode outlet area across the electrolyte membrane increases so the cathode becomes exposed to a high potential state.

3) When a sufficient amount of hydrogen is supplied to the anode side, the anode reaction and the cathode reaction take place in the PEFC, which brings the cathode and the anode out of the high potential state.

The technologies described in JP-T-2003-508877 and JP-A-2004-22503 are countermeasure technologies for the anode side so they are able to suppress degradation of the anode constituent material in the case of 1) above. However, with respect to 2) above, neither JP-T-2003-508877 nor JP-A-2004-22503 make any mention of 2) above so the technologies described in those publications are unable to prevent degradation of the cathode material which is caused by 2) above. When the cathode material degrades, it is more difficult for the cathode reaction to take place. As a result, the performance of the fuel cell declines. That is, with the technologies described in JP-T-2003-508877 and JP-A-2004-22503 it is difficult to suppress a decline in performance caused by a fuel deficiency.

Also, neither JP-A-2005-149742 nor JP-A-2005-294264 make any mention of 2) above. Therefore, it is difficult to prevent degradation of the cathode material that is caused by 2) above.

Here, even if there is a shortage of hydrogen supplied to the anode while the fuel cell is operating, such that the anode is in a hydrogen deficient state, the operating environment of the fuel cell is normally controlled by a control apparatus or the like. Therefore, before long hydrogen is supplied to the anode thus bringing it out of the fuel deficient (hereinafter also referred to as "hydrogen deficient") state. That is, the countermeasure for 1) above alone is insufficient as a countermeasure for the hydrogen deficient state. Only by implementing the countermeasures for both 1) and 2) above does it first become possible to effectively suppress a decline in performance in the fuel cell that is caused by a shortage of hydrogen.

SUMMARY OF THE INVENTION

This invention thus provides a fuel cell capable of suppressing a decline in performance caused by a fuel deficiency.

One aspect of the invention relates to a fuel cell including an anode, a cathode, and an electrolyte membrane arranged between the anode and the cathode, in which a fuel deficiency countermeasure is implemented both for the anode and for the cathode.

Here, the fuel deficiency countermeasure implemented for the anode refers to a measure for suppressing degradation of the constituent material of the anode when there is a shortage of hydrogen supplied to the anode such that the anode falls into a hydrogen deficient state. Specific examples of fuel deficiency countermeasures implemented for the anode include the technologies described in JP-T-2003-508877 and JP-A-2004-22503. In addition, the fuel deficiency countermeasure implemented for the cathode refers to a measure for suppressing degradation of the constituent material of the cathode when the portion of the cathode opposite the anode outlet area is exposed to a high potential state between the time hydrogen starts to return to the anode that was in a hydrogen deficient state and the time the anode has recovered from the hydrogen deficient state. Specific examples of a fuel deficiency countermeasure implemented for the cathode include a countermeasure which is used as a material degradation countermeasure for when the cathode is exposed to a high potential state at times other than when the anode is returning from a hydrogen deficient state (such as using highly crystallized carbon for the carrier body, for example), using platinum black as the normal catalyst of the cathode, and making the cathode catalyst layer with a multi-layered structure (i.e., a structure having a layer that has a normal catalyst and a layer that has, for example, $IrO_2$ carried on carbon (hereinafter referred to as $IrO_2/C$)).

Accordingly, a fuel deficiency countermeasure is implemented for both the anode and the cathode. Therefore, even if there is a shortage of hydrogen supplied to the anode, degradation of the constituent material of the anode can be suppressed. Moreover, even if the cathode is exposed to a high potential state between the time that hydrogen starts to be supplied to the anode again after a hydrogen deficiency and the time that the anode has completely recovered from the hydrogen deficient state, degradation of the constituent material of the cathode can be suppressed. As a result, the invention provides a fuel cell that suppresses a decline in performance caused by a fuel deficiency.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

When there is a shortage of hydrogen supplied to the anode of a fuel cell, the performance of the fuel cell declines. One solution to this problem is to provide a water electrolysis catalyst on the anode side, for example, to suppress a decline in performance during a hydrogen deficiency, caused by material degradation on the anode side or the like. However, it has been discovered that when hydrogen is supplied to the anode to rectify the hydrogen deficient state while the fuel cell is operating, the cathode becomes exposed to a high potential state that may reduce the performance of the fuel cell. The related art described above only implements measures for the anode and thus is unable to prevent a decline in performance of the fuel cell caused when the cathode is exposed to a high potential state during the recovery from a hydrogen deficient state. Therefore, in order to suppress the decline in performance of the fuel cell, a countermeasure for not only the anode side but also for the cathode side is necessary.

To facilitate understanding of the invention, reactions that can occur i) when the fuel cell is operating normally, ii) when there is a hydrogen deficiency, and iii) when returning from a hydrogen deficiency will hereinafter be described with reference to the accompanying drawings.

Figure 4:
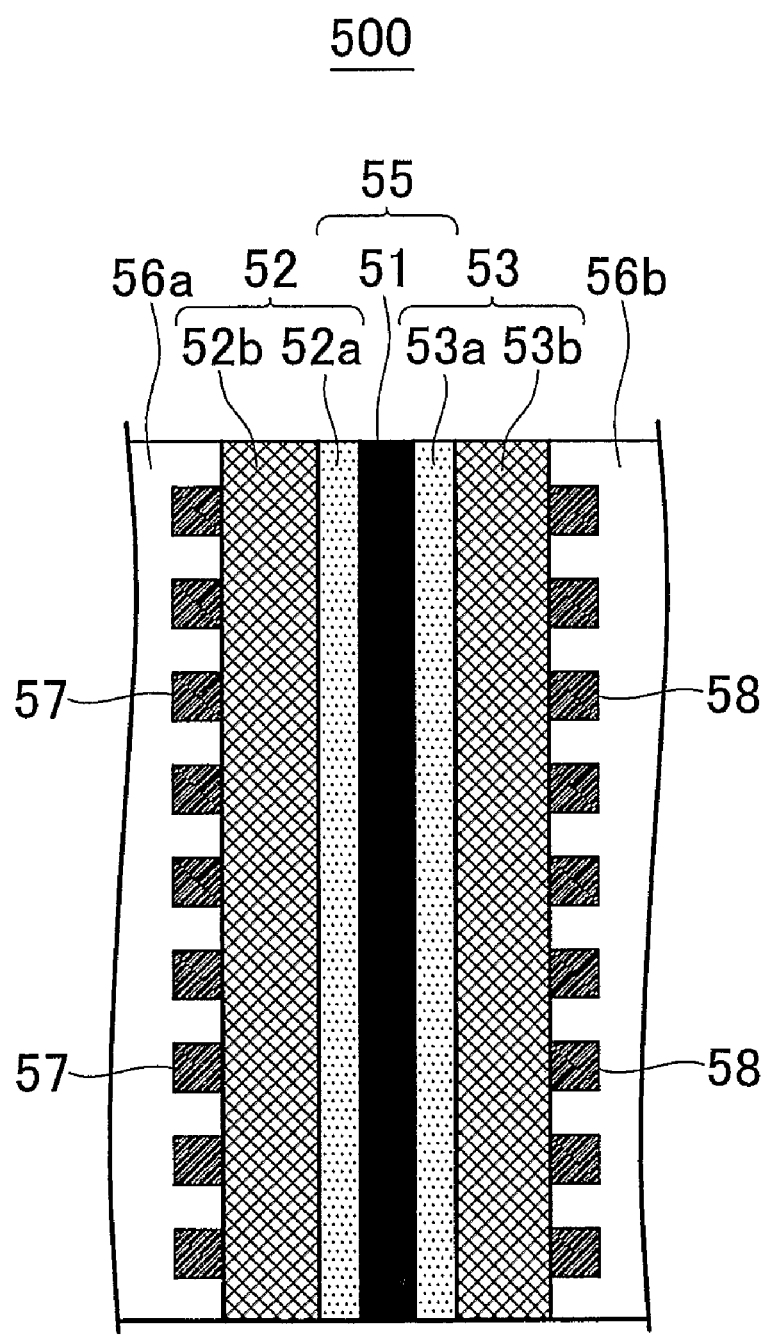
FIG. 4 is a sectional view of a portion of a fuel cell according to related art.
Figure 5:
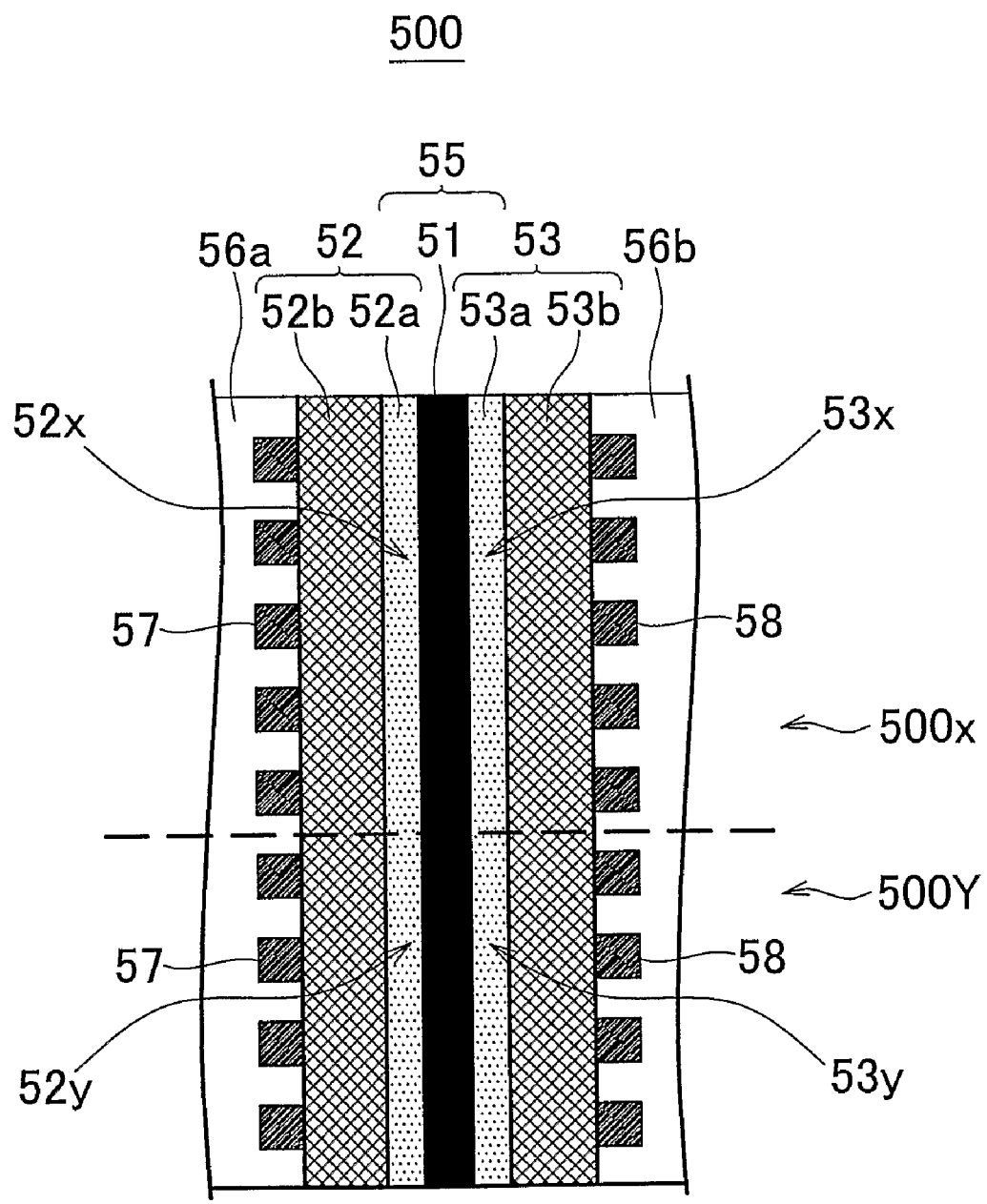
FIG. 5 is a sectional view of a portion of the fuel cell shown in FIG. 4 illustrating a hydrogen deficient state.

FIGS. 4 and 5 are sectional views schematically showing a portion of a fuel cell. In FIGS. 4 and 5, the stacking direction of the cells is in the left-right direction of the drawings. The fuel cells illustrated in FIGS. 4 and 5 have the same structure in terms of members and differ only in the supply state of the reaction gas. In the fuel cell in FIG. 5, hydrogen is supplied only to the anode portion located above the broken line (hereinafter also referred to as the "upper half") and has not yet reached the anode portion located below the broken line (hereinafter also referred to as the "lower half"). Hereinafter, the reactions and the like that can occur when there is a deficiency of hydrogen in the fuel cell will be described with reference to FIGS. 4 and 5.

A fuel cell 500 (hereinafter also referred to simply as "cell 500") includes an electrolyte membrane 51, an anode 52 arranged on one side of the electrolyte membrane 51, a cathode 53 arranged on the other side of the electrolyte membrane 51, a separator 56a arranged on the outside of the anode 52, and a separator 56b arranged on the outside of the cathode 53. The anode 52 includes an anode catalyst layer 52a, which includes a normal catalyst, and an anode diffusion layer 52b provided to enable hydrogen to be supplied evenly to the anode catalyst layer 52a, for example. The cathode 53 includes a cathode catalyst layer 53a, which includes a normal catalyst, and a cathode diffusion layer 53b provided to enable a reaction gas (hereinafter referred to as "air") to be supplied evenly to the cathode catalyst layer 53a. The electrolyte layer 51, the anode catalyst layer 52a, and the cathode catalyst layer 53b together form an MEA 55. Moreover, reaction gas flow passages 57 are formed on the side of the separator 56a near the anode diffusion layer 52b and reaction gas flow passages 58 are formed on the side of the separator 56b near the cathode diffusion layer 53b.

While a sufficient amount of hydrogen is being supplied to the anode catalyst layer 52a via the reaction gas flow passages 57 shown in FIG. 4 and a sufficient amount of air is being supplied to the cathode catalyst layer 53a via the reaction gas flow passages 58 the anode reaction takes place in the anode catalyst layer 52a and the cathode reaction takes place in the cathode catalyst layer 53a and electrical energy can be extracted through the separators 56a and 56b.

However, if the supply of hydrogen to the anode catalyst layer 52a shown in FIG. 4 stops, hydrogen is no longer supplied to the normal catalyst in the anode catalyst layer 52a so the anode reaction does not take place. However, as described above, the fuel cell is normally used in a stack. Therefore, even if some of the cells in the stack are unable to generate electricity, electrical energy can still be extracted from the stack as a whole as long as other cells are able to generate electricity. As a result, the fuel cell can continue to operate even if some of the cells in the stack are unable to generate electricity so electrons move from the anode 52 to the cathode 53 even if the fuel cell 500 is in this kind of state.

In the anode 52 when there is a hydrogen deficiency, protons and electrons are produced by the following reaction.

$$H_2O \rightarrow (1/2)O_2 + 2H^+ + 2e^- \qquad \text{(Expression 1)}$$

Here, Expression 1 above is a water electrolysis reaction. When water is present in the anode 52, protons and electrons are produced by this reaction. In addition, when carbon is provided in the anode as the carrier of the normal catalyst or as the constituent material of the diffusion layer or the like, protons and electrons are produced by the following reaction.

$$(1/2)C + H_2O \rightarrow (1/2)CO_2 + 2H^+ + 2e^- \qquad \text{(Expression 2)}$$

Expression 2 is an oxidation reaction of carbon. When this reaction progresses, the carbon carrying the catalyst or carbon in the diffusion layer degrades. In a hydrogen deficient state, both the reaction in Expression 1 and the reaction in Expression 2 can progress. Therefore, in order to suppress material degradation of the anode, the reaction in Expression 2 must be suppressed. Examples of ways to suppress this reaction include i) reducing the amount of water that reacts with the carbon in Expression 2 by promoting the reaction in Expression 1, and ii) reducing the possibility of the reaction in Expression 2 taking place by reducing the amount of carbon in the anode. With the first example, it is effective to use a fuel cell having a water electrolysis catalyst in the anode, and with the second example, it is effective to form the anode diffusion layer out of a non-carbon based material that is highly resistant to corrosion.

On one hand, when hydrogen starts to be supplied to the anode in a hydrogen deficient state, the fuel cell is first in a state in which hydrogen reaches the upper half of the anode 52 (hereinafter referred to as "anode 52x") shown in FIG. 5, but does not yet reach the lower half of the anode 52 (hereinafter referred to as "anode 52y"). In the cell 500 in this state, the anode reaction takes place in the anode 52x to which hydrogen is being supplied. Protons produced by that reaction pass through the electrolyte membrane 51 to the cathode 53x which is positioned on the opposite side of the electrolyte membrane 51 from the anode 52x, while electrons produced by that anode reaction travel to the anode 52y. Then in the cathode 53x to which air is being supplied, a reaction occurs between the oxygen, the protons that have traveled from the anode 52x, and the electrons from the cathode 53y that is positioned on the opposite side of the electrolyte membrane 51 from the anode 52y, thus yielding the cathode reaction.

In contrast, oxygen that was produced during the hydrogen deficient state is present in the anode 52y to which the hydrogen has not yet spread. Therefore, in the anode 52y, instead of the anode reaction, a reaction takes place between the residual oxygen, the electrons produced by the anode reaction in the anode 52x, and the protons that have traveled from the cathode 53y, which produces water. When these kinds of reactions take place in the anode 52x and the cathode 53x, as well as in the anode 52y and the cathode 53y, the potential of the anode 52x is approximately 0 volts, the potential in the cathode is approximately 0.8 volts, and the potential of the anode 52y is approximately 0.8 volts, while the cathode 53y is exposed to a potential state (a high potential state) of 1.6 volts. The reaction that takes place in the cathode 53y that is exposed to this high potential state will be described later.

In this way, when returning from a hydrogen deficient state, the potential of the cathode portion opposite the area of the anode portion to which hydrogen has not yet spread (i.e., that cathode portion corresponding to the cathode 53y) increases and the material of the cathode portion exposed to the high potential state degrades. Therefore, in order to suppress material degradation of the fuel cell during a fuel deficiency, measures must be taken not only for the anode side but also for the cathode side.

A fuel cell according to an example embodiment of the invention suppresses a decrease in performance due to a fuel deficiency by incorporating both a fuel deficiency countermeasure for the anode side which suppresses degradation of the anode material when there is a shortage of a hydrogen, and a fuel deficiency countermeasure for the cathode side which suppresses degradation of the cathode material when hydrogen starts to be supplied following a shortage of hydrogen.

Hereinafter, the fuel cell according to the example embodiment of the invention will be described with reference to the accompanying drawings.

Figure 1:
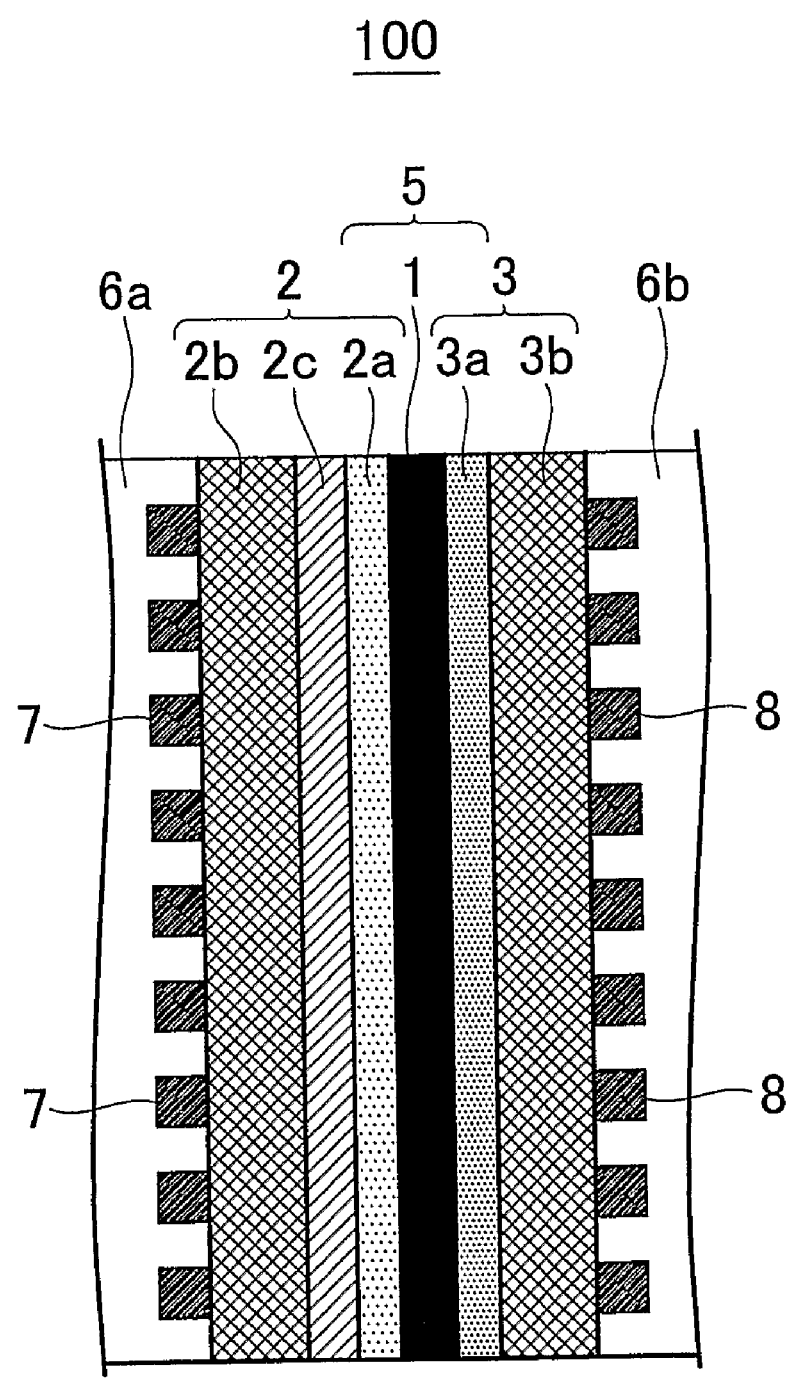
FIG. 1 is a sectional view schematically showing an example structure of a portion of a fuel cell according to an example embodiment of the invention.

FIG. 1 is a sectional view schematically showing an example structure of a portion of a unit cell provided in a fuel cell according to one example embodiment of the invention (hereinafter this unit cell will simply be referred to as "fuel cell"). The cell stacking direction is the left-right direction of the drawing. As shown in FIG. 1, the fuel cell 100 of the invention includes an electrolyte membrane 1 that has an electrolyte component (such as Nafion, a registered trademark of DuPont Corp., but hereinafter simply referred to as "electrolyte component"), an anode 2 arranged on one side of the electrolyte membrane 1, a cathode 3 arranged on the other side of the electrolyte membrane 1, a separator 6a arranged on the outside of the anode 2, and a separator 6b arranged on the outside of the cathode 3. The anode 2 includes an anode catalyst layer 2a which includes a normal catalyst and an electrolyte component, an anode diffusion layer 2b provided to enable hydrogen to be supplied evenly to the anode catalyst layer 2a, for example, and a water electrolysis catalyst layer 2c arranged between the anode catalyst layer 2a and the anode diffusion layer 2b. The cathode 3 includes a cathode catalyst layer 3a, which includes a highly crystallized catalyst in which a normal catalyst is carried on highly crystallized carbon, and a cathode diffusion layer 3b provided to enable a reaction gas to be supplied evenly to the cathode catalyst layer 3a. The electrolyte layer 1, the anode catalyst layer 2a, and the cathode catalyst layer 3b together form an MEA 5. Moreover, reaction gas flow passages 7 are formed on the side of the separator 6a near the anode diffusion layer 2b and reaction gas flow passages 8 are formed on the side of the separator 6b near the cathode diffusion layer 3b.

The fuel cell 100 in this example embodiment is provided with a water electrolysis catalyst layer 2c in the anode 2 and a highly crystallized catalyst in the cathode catalyst layer 3a. Here, the water electrolysis catalyst layer 2c refers to a layer that includes a catalyst (a water electrolysis catalyst) that promotes the water electrolysis reaction better than a normal catalyst does. One example of the water electrolysis catalyst layer 2c is one formed by dispersing a water electrolysis catalyst in an electrolyte component. When the normal catalyst is platinum, specific examples of the water electrolysis catalyst that can be provided in the water electrolysis catalyst layer 2c include Ir, Ir type material such as $IrO_2$, Ru type material such as $RuO_2$, or a combination thereof.

Therefore, even if hydrogen stops being supplied to the anode 2 such that the anode 2 falls into a hydrogen deficient state, the reaction in Expression 1 is promoted in the water electrolysis catalyst provided in the water electrolysis catalyst layer 2c, thus suppressing degradation of the constituent material of the anode 2. Moreover, even if at least a portion of the cathode 3 is exposed to a high potential state when the anode 2 starts to return from the hydrogen deficient state as hydrogen starts to be supplied to the anode 2, the highly crystallized catalyst which does not easily corrode is provided in the cathode catalyst layer 3a so degradation of the constituent material of the cathode 3 is suppressed.

Figure 2:
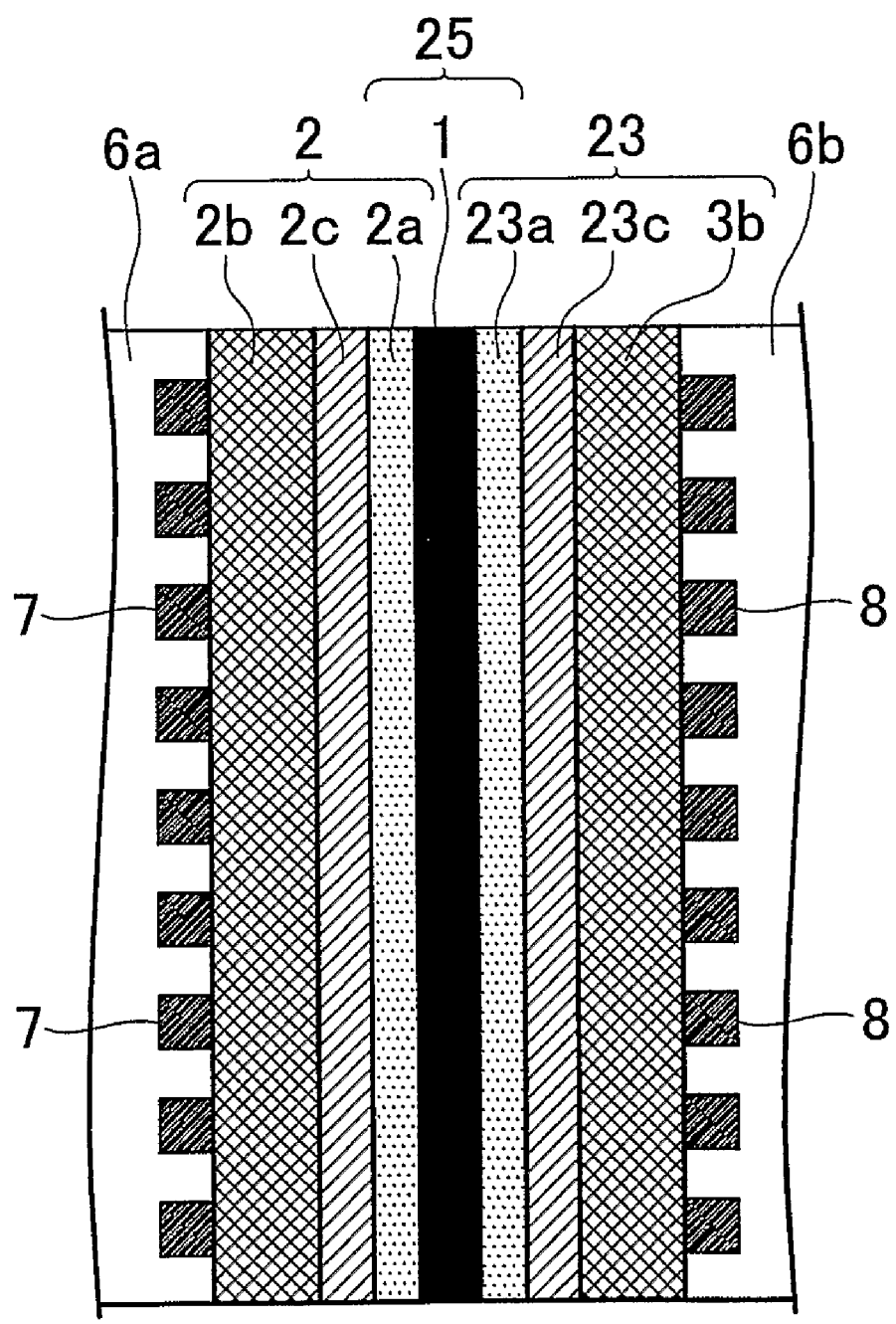
FIG. 2 is a sectional view schematically showing an example structure of a portion of a fuel cell according to a modified example of the example embodiment of the invention.

FIG. 2 is a sectional view schematically showing an example structure of a portion of a fuel cell according to a modified example of the example embodiment of the invention. The stacking direction of the cell is in the left-right direction of the drawing. In FIG. 2, members that are of the same structure as those shown in FIG. 1 will be denoted by the same reference numerals as they are in FIG. 1 and descriptions of those members will be omitted when appropriate.

As shown in FIG. 2, a fuel cell 200 according to this example embodiment includes an electrolyte membrane 1, an anode 2 arranged on one side of the electrolyte membrane 1, a cathode 23 arranged on the other side of the electrolyte membrane 1, a separator 6a arranged on the outside of the anode 2, and a separator 6b arranged on the outside of the cathode 23. The cathode 23 in the fuel cell 200 includes a cathode catalyst layer 23a which includes a normal catalyst and an electrolyte component, a cathode diffusion layer 3b provided so that reaction gas can be supplied evenly to the cathode catalyst layer 23a, for example, and an $IrO_2$ containing layer 23c arranged between the cathode catalyst layer 23a and the cathode diffusion layer 3b. The electrolyte membrane 1, the anode catalyst layer 2a, and the cathode catalyst layer 23a together form an MEA 25.

The fuel cell 200 according to the modified example has the water electrolysis catalyst layer 2c provided in the anode 2 and the $IrO_2$ containing layer 23c provided in the cathode 23. Here, the $IrO_2$ in the $IrO_2$ containing layer 23c can be provided in the form of $IrO_2/C$, for example. According to the fuel cell 200 in this modified example, even if hydrogen stops being supplied to the anode 2 such that the anode 2 falls into a hydrogen deficient state, the reaction in Expression 1 can take place in the water electrolysis catalyst provided in the water electrolysis catalyst layer 2c, thus suppressing degradation of the constituent material of the anode 2. Furthermore, even if at least a portion of the cathode 23 is exposed to a high potential state when hydrogen starts to be supplied to the anode 2, degradation of the constituent material of the cathode 23 is suppressed by promoting a water electrolysis reaction on the $IrO_2$, which promotes a water electrolysis reaction better than a normal catalyst does, in the $IrO_2$ containing layer 23c provided in the cathode 23.

The reason why providing $IrO_2/C$ in the cathode prevents the degradation of the constituent material of the cathode is as follows. The following reactions take place in a cathode exposed to a high potential state when returning from a hydrogen deficient state.

$$H_2O \rightarrow (\tfrac{1}{2})O_2 + 2H^+ + 2e^- \quad \text{(Expression 3)}$$

$$(\tfrac{1}{2})C + H_2O \rightarrow (\tfrac{1}{2})CO_2 + 2H^+ + 2e^- \quad \text{(Expression 4)}$$

$$Pt \rightarrow Pt^{2+} + 2e^- \quad \text{(Expression 5)}$$

Humidified air is supplied to the cathode so that the electrolyte membrane of the PEFC will conduct ions under wet conditions. Also, when the fuel cell is operating normally, water is produced by the cathode reaction. Therefore, water is normally present within the cell so the reactions in Expressions 3 to 5 can take place in a cathode exposed to a high potential state. Here, Expression 4 is an oxidation reaction of carbon in which carbon reacts with water. When this reaction progresses, the carbon provided in the cathode (for example, carbon with low crystallinity that carries a normal catalyst or carbon constituting a cathode diffusion layer) degrades. Meanwhile Expression 5 is an oxidation reaction of platinum, which progresses by cations ($Pt^{2+}$) dissolving in water. When the reaction in Expressions 4 or 5 progresses, it is more difficult for the cathode reaction to take place.

Expression 3 is the electrolysis reaction of water. If the reaction in Expression 3 is preferentially promoted over the reactions in Expressions 4 and 5, then the electrolysis reaction of water can be preferentially promoted over the oxidation reactions of carbon and platinum so that degradation of the constituent material of the cathode is suppressed. Moreover, if the electrolysis reaction of water is preferentially promoted, then the total amount of water that reacts with the carbon in Expression 4 and the water into which the $Pt^{2+}$ is dissolved in Expression 5 can be reduced, which also suppresses the reactions in Expressions 4 and 5, thus enabling the degradation of the constituent member of the cathode to be suppressed. Therefore, having a structure in which $IrO_2/C$ is provided in the cathode enables material degradation of the cathode to be suppressed.

In this way, the fuel cell 200 according to this modified example embodiment suppresses degradation of not only the constituent material of the anode but also the constituent material of the cathode. As a result, a decline in performance of the fuel cell caused by a hydrogen deficiency can be suppressed.

In the foregoing description related to the modified example, as a countermeasure on the cathode side, the $IrO_2$ containing layer is provided, in addition to the cathode catalyst layer and the cathode diffusion layer, in the cathode. However, the countermeasure on the cathode side that the invention is able to use is not limited to this. For example, if $IrO_2/C$ is provided in the cathode, the $IrO_2/C$ may be provided in the cathode catalyst layer. However, from the viewpoint of facilitating the cathode reaction during initial operation of the fuel cell, the $IrO_2/C$ may be provided in a layer (such as the $IrO_2$ containing layer described above) other than the cathode catalyst layer. In addition, for example, a structure in which no carbon is provided in the cathode catalyst layer prevents the reaction in Expression 4 in the cathode catalyst layer, and thus also enables material degradation of the cathode to be suppressed. Here, specific examples of structures in which there is no carbon provided in the cathode catalyst layer are a structure that includes an electrolyte component and platinum black powder (Pt black) having particle diameters on the order of 0.3 to 100 nm, inclusive, and more preferably, 5 to 10 nm, inclusive, and a structure in which PtRu black is provided instead of Pt black. Particles having the diameter described above are larger in diameter than the platinum used in a conventional PEFC so there is less surface energy and leaching and aggregation are able to be suppressed. The cathode catalyst layer having the foregoing structure can be manufactured by, for example, dispersing Pt black or PtRu black into an electrolyte component that is in a soluble or molten state and then drying or cooling it.

When $IrO_2/C$ is provided in the cathode of the fuel cell according to this modified example, the manner in which it is dispersed in not particularly limited. Here, because hydrogen is supplied from the inlet side of the anode when the anode is returning from a hydrogen deficient state, it takes a longest amount of time for the hydrogen to spread to the outlet of the anode. That is, when the anode is returning from a hydrogen deficient state, the cathode portion that is exposed to the high potential state for the longest time is the cathode portion opposite the outlet area of the anode so it is thought that material degrades more easily in a cathode portion that is closer to a position opposite the outlet of the anode. Therefore, in the fuel cell according to this modified example, to even more effectively suppress material degradation of the cathode portion opposite the outlet area of the anode, $IrO_2/C$ may be dispersed in so that the concentration of the $IrO_2/C$ catalysts on the cathode increases in the direction towards the outlet area of the anode. Also, the crystallinity of the carrier carbon may also be changed.

Further, as described above, because the lower half of the cell (i.e., cell 500y) acts as a single resistant element when the anode is returning from a hydrogen deficient state, electrons produced at the anode portion to which hydrogen is being supplied (i.e., anode 52x) may travel to the anode 52y (i.e., may travel in a direction parallel to a plane that is orthogonal to the normal cell stacking direction). In addition, electrons produced at the cathode portion exposed to a high potential state (i.e., cathode 53y) may travel to the cathode 53x (i.e., may also travel in the direction parallel to a plane that is orthogonal to the normal cell stacking direction (hereinafter referred to as the "plane direction"). When the electrons travel in the plane direction (hereinafter referred to as "in-plane movement"), the electrical energy that is able to be extracted from the fuel cell decreases. Therefore, preventing this in-plane movement of electrons is effective from the viewpoint of suppressing a decline in performance caused by a fuel deficiency. A specific example of a method for preventing in-plane movement of electrons is to make the fuel cell provided with separator, a diffusion layer, and a catalyst layer, which prevent electrons from moving in the in-plane direction.

Also in the foregoing description related to the example embodiment, an example was described in which the water electrolysis catalyst layer is provided on the anode. However, the fuel deficiency countermeasure for the anode side that can be used in the fuel cell of this invention is not limited to this. For example, when a water electrolysis catalyst is provided on the anode, that water electrolysis catalyst may be provided in the anode catalyst layer. In addition, even if the water electrolysis catalyst is not provided, using a highly crystalline carbon for the carbon provided in the anode improves the corrosion resistance of the carbon provided in the anode, and thus suppresses material degradation of the anode.

Hereinafter, the fuel cell of the invention will be described in more detail with reference to Example.

A first catalyst paste is manufactured by dissolving an electrolyte component (such as Nafion) in an organic solvent (a mixture of water, methanol, and 2-propanol) and dispersing platinum supporting carbon in the dissolved electrolyte component (hereinafter referred to as "first electrolyte component"). Also, a second catalyst paste is manufactured by dissolving an electrolyte component in a water based solvent (which contains essentially only water) and dispersing platinum black powder in the dissolved electrolyte component. Then an anode catalyst layer was formed by applying the first catalyst paste to one side of an electrolyte membrane (Nafion 112 by DuPont Corp.) and drying it, and a cathode catalyst layer was formed by applying the second catalyst paste to the other side of the electrolyte membrane and drying it, thus yielding an MEA according to Example. An MEA of a comparative example was manufactured by applying the first catalyst paste to both sides of the electrolyte membrane and drying it.

Moreover, a water electrolysis catalyst layer was formed by applying a water electrolysis catalyst paste in which Ir/C had been dispersed in the first electrolyte component to the surface of an anode diffusion layer formed of carbon paper that is made of carbon fiber and drying it. The assembly of Example was then made by joining the anode diffusion layer with the water electrolysis catalyst layer obtained in the manner described above with the anode catalyst layer of the MEA of Example, and joining the cathode diffusion layer which is formed of carbon paper made of carbon fiber (hereinafter simply referred to as "cathode diffusion layer") with the cathode catalyst layer of the MEA of Example. Then a fuel cell of Example was manufactured by arranging separators in which reaction gas passages are formed, on both sides (i.e., on the outside of the anode diffusion layer and the outside of the cathode diffusion layer) of that assembly. Meanwhile, an assembly of the comparative example was formed by joining the anode diffusion layer having the water electrolysis catalyst layer with the anode catalyst layer of the MEA of the comparative example, and joining the cathode diffusion layer with the cathode catalyst layer of the MEA of the comparative example. Then, a fuel cell of the comparative example was manufactured by arranging separators in which reaction gas passages are formed, on both sides of that assembly. That is, the fuel cell according to Example was provided with a water electrolysis catalyst layer as a fuel deficiency countermeasure for the anode, and also had a catalyst with no carrier carbon as a fuel deficiency countermeasure for the cathode. On the other hand, the fuel cell according to the comparative example was provided with a water electrolysis catalyst layer as a fuel deficiency countermeasure for the anode and had no fuel deficiency countermeasure for the cathode.

Figure 3:
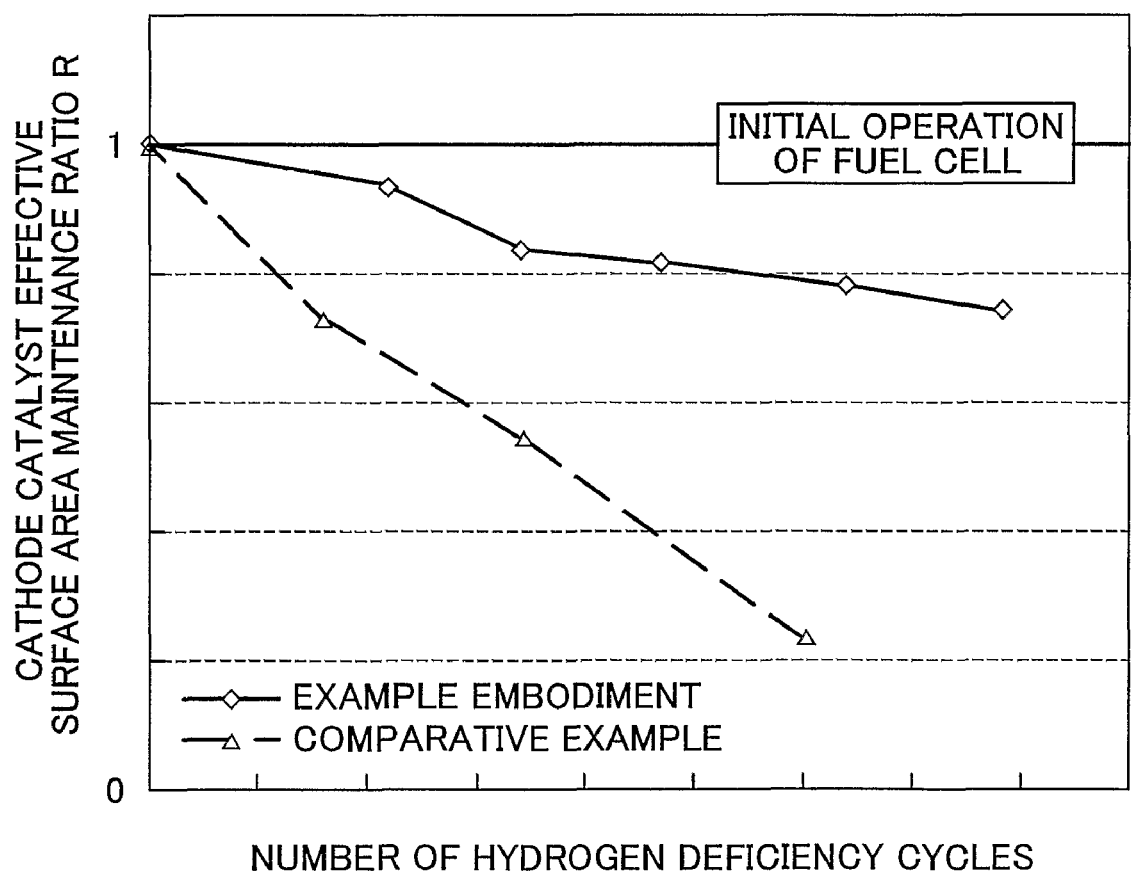
FIG. 3 is a graph showing the results from a hydrogen deficiency test.

The fuel cells according to both Example and the comparative example that were manufactured as described above were maintained at 70° C. with air supplied at full humidity to the cathode side of each fuel cell. Then during simulation of a hydrogen deficiency state, the cycle was repeated in which the current density was set at 0.2 A/cm$^2$ and nitrogen was supplied at full humidity to the anode for 10 minutes, after which the current density was then made 0 A/cm$^2$, and hydrogen was supplied at full humidity to the anode until the OCV returned to the normal value (hereinafter this cycle will be referred to as the "hydrogen deficiency cycle"). Degradation of the catalyst in the cathode was then checked. An effective surface area S1 of the catalyst was obtained from the electrical quantity of hydrogen desorption of the cyclic voltammogram of the catalyst after the hydrogen deficiency cycle, and the degradation of the catalyst was evaluated from the ratio of the effective surface area S1 at that time to the effective surface area S2 before the hydrogen deficiency cycle was implemented (i.e., R=S1/S2; hereinafter R refers to the "cathode catalyst effective surface area maintenance ratio"). FIG. 3 shows the evaluation results. The horizontal axis represents the number of hydrogen deficiency cycles and the vertical axis represents the cathode catalyst effective surface area maintenance ratio. A higher cathode catalyst effective surface area maintenance ratio means less degradation of the catalyst in the cathode. Hence, if the cathode catalyst effective surface area maintenance ratio is high, the fuel cell is regarded as one that is able to suppress a decline in performance from a hydrogen deficiency.

As shown in FIG. 3, the value of the cathode catalyst effective surface maintenance ratio of the fuel cell of Example in which fuel deficiency countermeasures were implemented for both the anode and the cathode is closer to 1 than the value of the cathode catalyst effective surface maintenance ratio of the fuel cell of the comparative example in which a fuel deficiency countermeasure was implemented only for the anode. Therefore, with the fuel cell according to invention, which implements fuel deficiency countermeasures for both the anode and the cathode, even if the cathode is exposed to a high potential state when the anode returns from a hydrogen deficient state, material degradation under that high potential state is suppressed. As a result, it was confirmed that a decline in performance due to a fuel deficiency is suppressed with the fuel cell of the invention.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A fuel cell comprising:
   an anode in which a fuel deficiency countermeasure is implemented when there is a shortage of fuel supplied to the anode so that the anode falls into a fuel deficient state;
   a cathode in which a fuel deficiency countermeasure is implemented when a portion of the cathode opposite an anode outlet area is exposed to a high potential state between a time the fuel starts to return to the anode and a time the anode recovers from the fuel deficient state; and
   an electrolyte membrane arranged between the anode and the cathode,
   wherein the fuel deficiency countermeasure implemented for the anode is a water electrolysis catalyst layer that is arranged between an anode catalyst layer, which includes a normal catalyst and an electrolyte component, and an anode diffusion layer that supplies reaction gas evenly to the anode catalyst layer,
   wherein the fuel deficiency countermeasure implemented for the cathode is a separate $IrO_2$ containing layer that is arranged between the cathode catalyst layer, which includes a normal catalyst and an electrolyte component, and a cathode diffusion layer that supplies reaction gas evenly to the cathode catalyst layer.

2. The fuel cell according to claim 1, wherein $IrO_2$ in the $IrO_2$ containing layer is carried on carbon.

3. The fuel cell according to claim 2, wherein the $IrO_2$ carried on carbon is dispersed in such a manner that the concentration of the $IrO_2$ increases the closer a portion of the cathode is to a position opposite an anode portion near an outlet of a fuel gas flow passage.

4. The fuel cell according to claim 1, wherein the $IrO_2$ carried on carbon is dispersed in such a manner that the concentration of the $IrO_2$ increases the closer a portion of the cathode is to a position opposite an anode portion near an outlet of a fuel gas flow passage.

* * * * *